United States Patent
Gagliano

(10) Patent No.: US 8,378,254 B2
(45) Date of Patent: Feb. 19, 2013

(54) ADAPTIVE VEHICLE MANUFACTURING SYSTEM AND METHOD

(75) Inventor: Charles J. Gagliano, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 554 days.

(21) Appl. No.: 12/557,724

(22) Filed: Sep. 11, 2009

(65) Prior Publication Data
US 2011/0066265 A1 Mar. 17, 2011

(51) Int. Cl.
*G06F 19/00* (2011.01)
(52) U.S. Cl. ................................ 219/121.64; 29/771
(58) Field of Classification Search .............. 700/95, 700/97; 29/33, 897.2, 464, 771, 712, 783; 296/208; 219/121.64, 121.79
See application file for complete search history.

(56) References Cited

U.S. PATENT DOCUMENTS

| | | | | |
|---|---|---|---|---|
| 4,016,020 A * | 4/1977 | Ongaro | | 156/75 |
| 4,103,532 A * | 8/1978 | Buzzi | | 73/11.08 |
| 5,010,637 A * | 4/1991 | Blanyer et al. | | 29/505 |
| 5,094,318 A * | 3/1992 | Maeda et al. | | 181/290 |
| 5,237,505 A * | 8/1993 | Beebe | | 73/459 |
| 5,380,978 A * | 1/1995 | Pryor | | 219/121.64 |
| 5,428,880 A * | 7/1995 | Tomioka et al. | | 29/458 |
| 5,560,589 A * | 10/1996 | Gran et al. | | 267/3 |
| 5,648,902 A * | 7/1997 | Honda | | 701/33.4 |
| 5,729,463 A * | 3/1998 | Koenig et al. | | 700/98 |
| 6,502,821 B2 * | 1/2003 | Schneider | | 296/146.6 |
| 6,691,397 B2 * | 2/2004 | Chakravarti | | 29/527.1 |
| 6,701,601 B2 * | 3/2004 | Davidson et al. | | 29/458 |
| 6,959,787 B2 * | 11/2005 | Husmann | | 187/292 |
| 7,191,637 B2 * | 3/2007 | Sonnenburg | | 73/11.04 |
| 7,264,303 B2 | 9/2007 | Fukudome et al. | | |
| 7,270,007 B2 * | 9/2007 | Serrano | | 73/649 |
| 7,300,102 B2 * | 11/2007 | Gupta et al. | | 296/208 |

(Continued)

FOREIGN PATENT DOCUMENTS

| | | |
|---|---|---|
| EP | 1177950 | 6/2002 |
| GB | 1599020 | 9/1981 |
| JP | 2006300304 | 11/2006 |
| JP | 200794567 | 4/2007 |

(Continued)

OTHER PUBLICATIONS

Priebsch et al, Numerical Sumlation od Vehicla Interior Nose up to 250 Hz, 2001, Sound and motion, p.# 149-162.*

(Continued)

*Primary Examiner* — Kidest Bahta
(74) *Attorney, Agent, or Firm* — Rankin Hill & Clark LLP

(57) ABSTRACT

An adaptive vehicle manufacturing system and method for reducing vibrations and/or improving interior sound performance includes optionally measuring vibration sensitivity of at least one body-in-white vehicle component. The body-in-white vehicle body is assembled at a weld station and includes the at least one body-in-white vehicle component. Optionally, vibration sensitivity of the assembled body-in-white vehicle body is measured. The body-in-white vehicle body is painted at a paint station. An optimal damping package for the body-in-white vehicle body is determined based on the measured vibration sensitivity of the at least one body-in-white vehicle component and/or the measured vibration sensitivity of the body-in-white vehicle body. Damping corresponding to the optimal damping package is applied to the body-in-white vehicle body after painting thereof at a damping station, which can include melt sheet robots for applying the damping package.

21 Claims, 2 Drawing Sheets

U.S. PATENT DOCUMENTS

| | | | |
|---|---|---|---|
| 7,574,801 B2 * | 8/2009 | Lowe et al. | 29/897.2 |
| 7,628,077 B2 * | 12/2009 | Yu et al. | 73/669 |
| 2002/0171260 A1 * | 11/2002 | Schneider | 296/146.6 |
| 2005/0044700 A1 * | 3/2005 | Ghuman et al. | 29/791 |
| 2006/0283015 A1 * | 12/2006 | Lowe et al. | 29/897.2 |
| 2007/0208443 A1 | 9/2007 | Caprioli | |
| 2008/0191397 A1 | 8/2008 | Biserni | |

FOREIGN PATENT DOCUMENTS

| | | |
|---|---|---|
| WO | 9315386 | 8/1993 |

OTHER PUBLICATIONS

Surampudi et al., Optimzation of Damping treatments for Structure Borne Noise Reduction, Sep. 2004, Daimerchrysiser Corpration, p. 14-17.*

Put a damper on the Noise, Jan. 2007, Polytec, www.polytec.com, pp. 1-2.*

SAE International Publication No. 931327 (Abstract only); Structural-Acoustic Analysis for the Prediction of Vehicle Body Acoustic Sensitivities; http://www.sae.org/technical/papers/931327; May 1993.

SAE International Publication No. 2007-01-3711 (Abstract only); Acoustic-Structural Sensitivity Analysis and Optimism of Car Body Multilayer Panels; http://www.sae.org/technical/papers/2007-01-3711; Aug. 2007.

SAE International Publication No. 2007-01-2199 (Abstract only); Damping Performance Measurement of Non-uniform Damping Treatments; http://www.sae.org/technical/papers/2007-01-2199; May 2007.

* cited by examiner

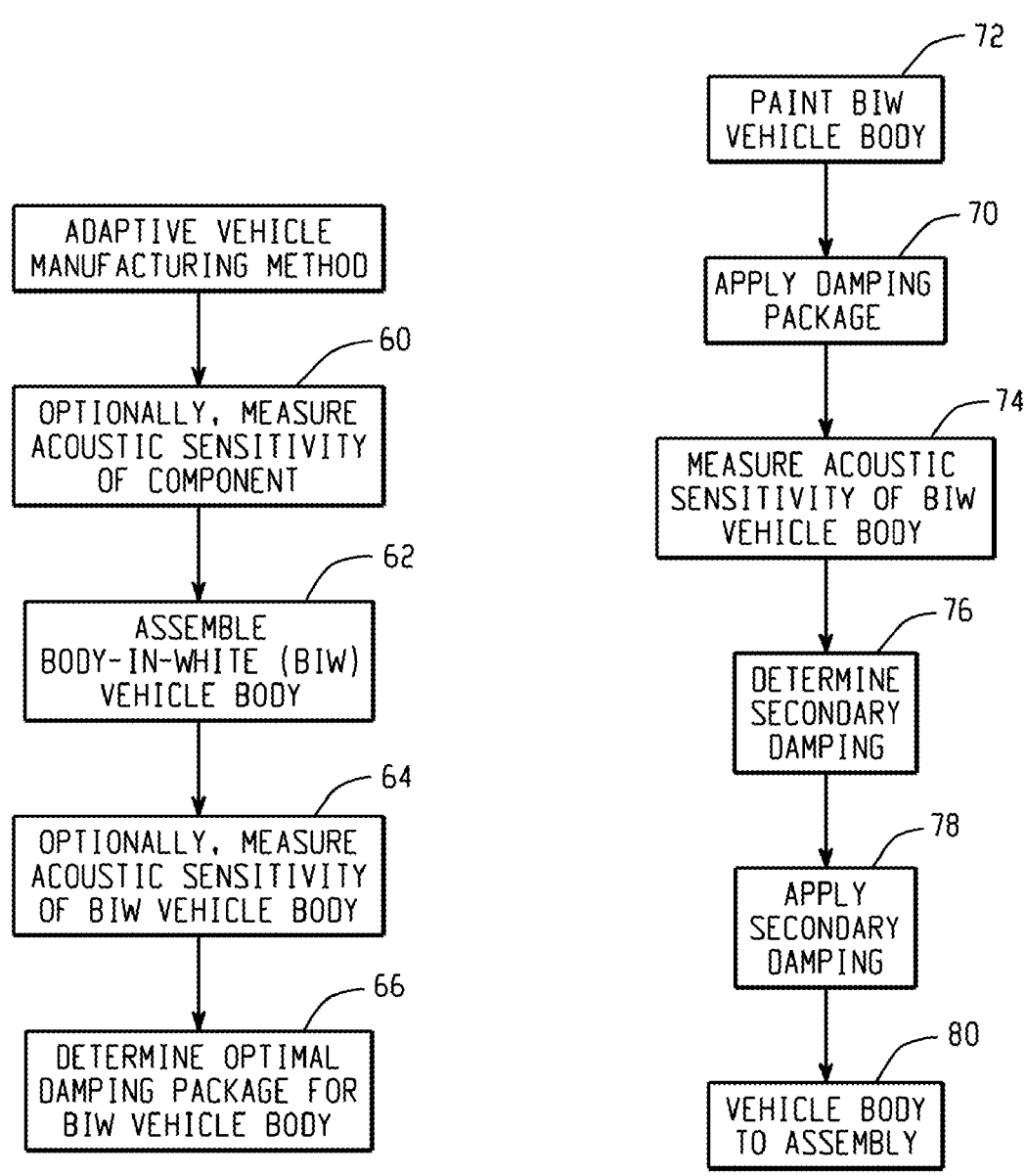

ADAPTIVE VEHICLE MANUFACTURING SYSTEM AND METHOD

BACKGROUND

The present disclosure generally relates to a manufacturing method and system for producing vehicles, and more particularly relates to an adaptive vehicle manufacturing system and method for reducing vibrations and/or improving interior sound performance of vehicles.

It is widely known that there can be significant variation between vehicles in the automotive manufacturing process. To some degree, such variation occurs in every component of an assembled vehicle, but some can have a greater impact than others. For vehicle noise and vibration performance, there can be a significant variation due to variability in the body structure in damping materials. For the body structure, there are various steps in the manufacturing process where critical components are assembled (e.g., components and sub-components delivered from suppliers, components and sub-components manufactured in-house and off-line, such as those from a weld line, etc.). Other critical areas of the manufacturing process where variations can have a significant impact include welding of the vehicle body and the painting of the welded vehicle body. Heretofore, quality control for these processes have been mainly controlled by visual inspection (i.e., there are limited automated checks).

In one conventional manufacturing process for vehicles, mass production variation can be roughly 10 dB for acoustic sensitivity in the mid-frequency range. This can result in undesirable vibrations and poor interior sound performance. While damping and mass application can reduce the effects of such acoustic sensitivity variation, there are limits and drawbacks associated with standard damping and mass application processes. For example, excess damping and mass application may be applied to vehicles in the manufacturing process to account for the worst case scenario where a particular vehicle is at an outer limit for acoustic sensitivity variation. In other words, a standard damping and mass application process is designed for vehicle bodies at the limits of an acoustic sensitivity variation tolerance and damping/mass application to vehicles that are not at the limits of such tolerance typically would result in excess damping and mass application. Additionally, application of standardized damping and mass application processes typically only reduces vibrations and improves interior sound performance to a limited degree.

SUMMARY

According to one aspect, an adaptive vehicle manufacturing method is provided for reducing vibrations and/or improving interior sound performance. More particularly, in accordance with this aspect, a body-in-white vehicle body is assembled including securing at least one body-in-white vehicle component. Vibration sensitivity is measured of at least one of: the body-in-white vehicle component or the assembled body-in-white vehicle body. An optimal damping package is determined for the body-in-white vehicle body based on at least one of the measured vibration sensitivity of the at least one body-in-white vehicle component and the measured vibration sensitivity of the body-in-white vehicle body.

According to another aspect, a vehicle manufacturing process is provided. More particularly, in accordance with this aspect, a body-in-white vehicle body including at least one body-in-white vehicle component is assembled. Vibrations in at least one of: one or more of the at least one body-in-white vehicle component and the body-in-white vehicle body, are measured. A damping package is applied to the body-in-white vehicle based on the measured vibrations.

According to still another aspect, a vehicle assembly line is provided. More particularly, in accordance with this aspect, the vehicle assembly line includes a weld station for welding a body-in-white vehicle body from body-in-white vehicle components, a paint station for painting the body-in-white vehicle body, and a damping station for applying damping to the body-in-white vehicles body after painting thereof. The damping station includes damping robots for applying a damping package to the body-in-white vehicle body based on vibration sensitivity measurements of at least one of: the body-in-white vehicle body and one or more of the body-in-white vehicle components.

BRIEF DESCRIPTION OF THE DRAWINGS

FIG. 2 is a block diagram illustrating an adaptive vehicle manufacturing method.

FIG. 3 is a block diagram illustrating further steps in an adaptive vehicle manufacturing method, such as that shown in FIG. 2.

DETAILED DESCRIPTION

Figure 1:
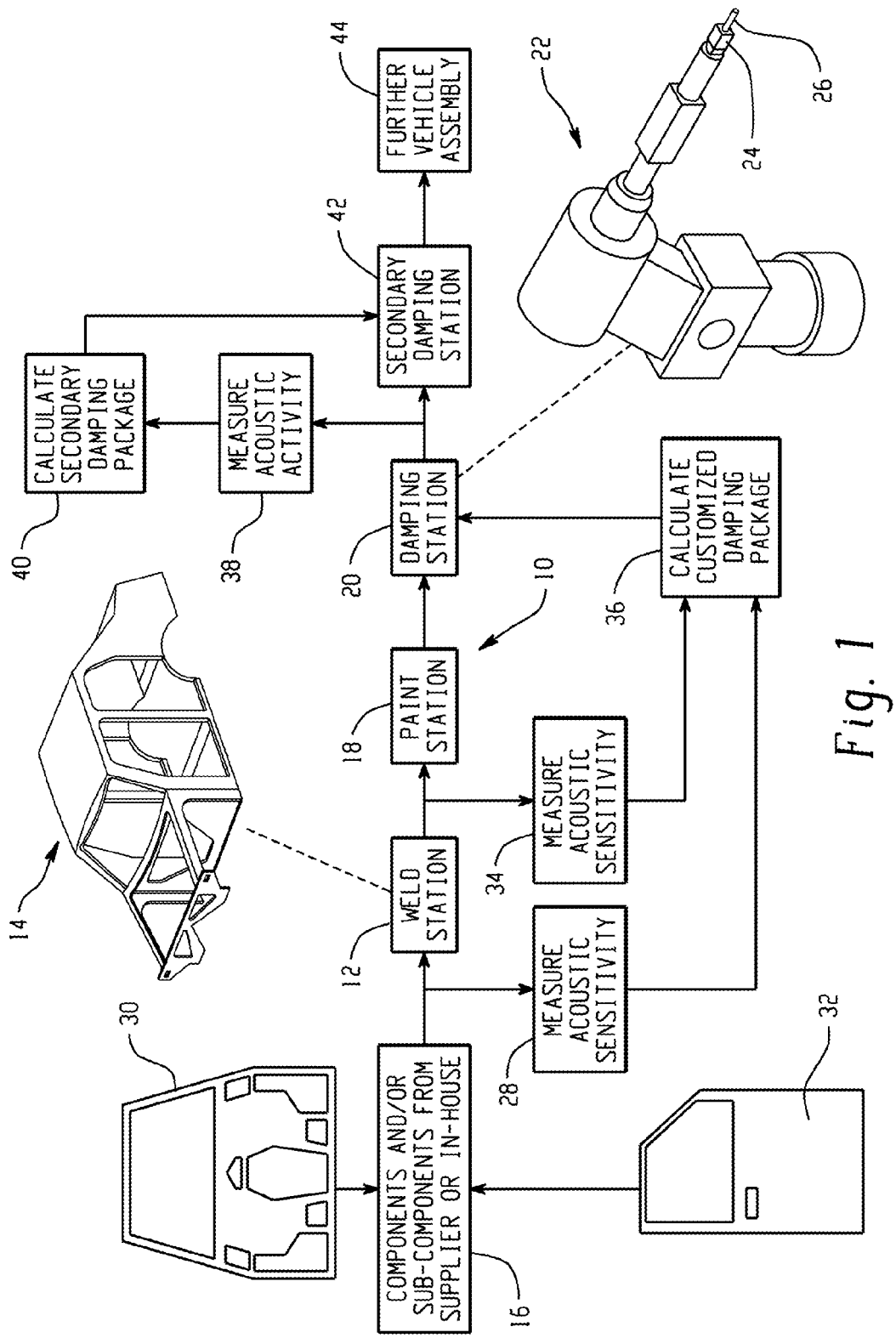
FIG. 1 is a schematic diagram illustrating an adaptive vehicle manufacturing system and method on a vehicle assembly line.

Referring now to the drawings, wherein the showings are only for purposes of illustrating one or more exemplary embodiments and not for limiting the same, FIG. 1 shows an adaptive vehicle manufacturing system and method for reducing vibrations and/or improving interior sound performance of vehicles assembled on a vehicle assembly line. As shown, vehicle assembly line 10 includes a weld station 12 for welding a body-in-white vehicle body 14 from body-in-white vehicle components. The body-in-white vehicle components that are secured together to form the body-in-white vehicle body 14 via welding at the weld station 12 can include many components and sub-components, which themselves can be delivered from a supplier or fabricated in-house as indicated at 16. Fabricated in-house could include components and/or sub-components that are formed in a common building, plant, area, etc. as that in which the assembly line 10 is disposed, and/or could further include components and/or sub-components manufactured by a common business entity as that which owns, controls, etc. the assembly line 10. The components and/or sub-components comprising the body-in-white vehicle body after welding at the weld station 12 can include, without limitation, vehicle frame members (e.g., frame rails, cross members, side sills, vertical pillars, etc.), vehicle closures (e.g., front doors, rear doors, tailgates, hoods, trunks, etc.), roof portions, fenders, quarter panels, etc.

The assembly line 10 can further include a paint station 18 for painting the body-in-white vehicle body 14. Thus, the body-in-white vehicle body 14 is passed to the paint station 18 after being welded at the weld station 12. After painting at the paint station 18, the painted body-in-white vehicle body 14 can be passed to a damping station 20 of the assembly line 10 for applying damping to the body-in-white vehicle body 14 after painting thereof. As is known and understood by those skilled in the art, the damping station 20 can include one or more robots 22 for applying a damping package to the body-in-white vehicle body 14. In particular, by way of example only, each of the robots 22 can have a wrist portion 24 equipped with an application nozzle 26. As is also known and understood, each of the robots 22 can be operated through a controller (not shown) such that the application of damping material through the nozzle 26 is synchronized with controlled movements by the robot 22 for application of the damping material at desired locations on the body-in-white vehicle body 14.

Conventionally, the controller would operate the robot 22 to apply damping material to a particular type of vehicle (e.g., a particular vehicle model) such that a similar damping package was applied to all vehicles of a particular type. The operation pattern corresponding to a particular vehicle type could be stored and recalled by the controller when that particular vehicle type was being worked on by the robot 22. In the vehicle assembly line 10 of the illustrated embodiment, however, the one or more robots 22 of the damping station 20 apply damping to the body-in-white vehicle body 14 (i.e., apply a damping package to the body-in-white vehicle body 14) based on vibration sensitivity measurements of at least one of: the body-in-white vehicle body and/or one or more of the vehicle components and/or sub-components forming the body-in-white vehicle body 14.

In the illustrated assembly line 10, vibration sensitivity measurements are taken at 28 of at least one of the body-in-white vehicle components forming the body-in-white vehicle body 14. The components and sub-components measured at 28 can include those received from a supplier or fabricated in-house as indicated at 16. In one exemplary embodiment, the particular components and/or sub-components measured for vibration sensitivity at 28 can include those determined as having a significant impact on the overall acoustic sensitivity or interior sound performance of the vehicle. For example, as shown, vibration sensitivity can be measured for a tailgate 30 and a vehicle closure 32, such as a vehicle front door. Again, these and/or other components or sub-components can be selected to have their vibration sensitivity measured at 28 based on an expected impact from these components corresponding to the acoustic vibrations and/or interior sound performance of the vehicle being assembled. Other components or subcomponents that could be selected to have vibration sensitivity monitored could include, for example, a floor panel or structure (front or rear), a dash component, a firewall component, a roof component or panel, a wheel housing, a spare tire well housing, a seat well housing (e.g., for storing a stowed seat), another door or closure, a parcel shelf, etc.

While measuring the vibration sensitivity at 28 is shown as part of the assembly line 10 in the illustrated embodiment, it is to be appreciated that such measurements could be taken separate from the assembly line 10. For example, the components and/or sub-components which have their vibration sensitivity measured could be done prior to delivery to the assembly line 10, and even off-site relative to the assembly line 10 (e.g., at the location of a supplier) from which the vibration sensitivity measurements could be forwarded for processing during assembly of the vehicle on the assembly line 10.

In addition, or in the alternative, vibration sensitivity measurements can be taken of the body-in-white vehicle body 14 after welding at the weld station 12 as indicated at 34. Vibration sensitivity measurements at 28 and 34 can bulb done in any suitable manner as is known and understood by those skilled in the art. In one example, vibration sensitivity is measured using a laser while a vibratory load is applied to the measured object (i.e., body-in-white part or body-in-white vehicle body 14).

As will be described in more detail below, the customized damping package can be calculated at 36 for each body-in-white vehicle body 14 being manufactured on the assembly line 10. The customized damping package can be determined based on the vibration sensitivity measurements taken at one or both of 28 and 34. That is, the customized damping package for each body-in-white vehicle body 14 can be calculated on the vibration sensitivity measured at 28 of the components and/or sub-components (e.g., those components and/or sub-components that are deemed most critical to the overall acoustic sensitivity and/or interior sound performance of the vehicle being manufactured) and/or the vibration sensitivity measured at 34 of the body-in-white vehicle body 14 after being welded at the weld station 12.

As will be understood and appreciated by those skilled in the art, calculation or determination of the customized damping package at 36 can be done using computer aided engineering (CAE) methods that are known and understood by those skilled in the art. Advantageously, in the illustrated embodiment, the customized damping package is provided for each body-in-white vehicle body 14 being manufactured on the assembly line 10 and determination of the damping package at 36 is done simultaneous with such manufacture of the body-in-white vehicle bodies 14. In other words, while the body-in-white vehicle body 14 is being welded at the weld station 12 and/or being painted at the paint station 18, the vibration sensitivity measurements taken at 28 and 34 can be simultaneously processed at 36 in anticipation of the body-in-white vehicle body 14 arriving at the damping station 20 for application of damping material by the one or more damping robots 22. Moreover, the damping applied at the damping station 20, which corresponds to a customized damping package, is particular to each body-in-white vehicle body 14 manufactured on the assembly line 10. While the damping station 20 and the paint station 18 are shown as discrete stations in the illustrated assembly line 10, it is to be appreciated that these stations could be physically together such that the body-in-white vehicle body 14 is painted at the same general location along the assembly line 10 as that where the damping is applied by the one or more damping robots 22.

After the damping is applied at the damping station 20, vibration sensitivity of the body-in-white vehicle body 14 can again be measured at 38 Using the vibration sensitivity measurements taken at 38, a secondary damping package can be calculated or determined at 40 or each body-in-white vehicle body 14 can be manufactured on the assembly line 10. The vibration sensitivity measurements taken at 38, of course, will take into account the damping previously applied by the one or more damping robots 22 at the damping station 20. From the damping station 20, the body-in-white vehicle bodies 14 are passed to a secondary damping station 42, which is for applying secondary damping to the body-in-white vehicle body 14 based on the vibration sensitivity measurements taken at 38 of the body-in-white vehicle body 14 (i.e., measurements taken after the damping is applied at the damping station 20).

In one exemplary embodiment, the secondary damping applied at the secondary damping station 42 can include the application of mass dampers to the body-in-white vehicle body 14 at specific locations thereon corresponding to the secondary damping package calculated or determined at 40. For example, mass dampers can be applied to the dash panel and/or floor of the body-in-white vehicle body 14 as determined at 40. Although the secondary damping station 42 is shown as a separate station relative to damping station 20, it is to be appreciated that these stations could together be provided at a single physical location or area along the assembly line 10. From the secondary damping station 42, the body-in-white vehicle body 14 is delivered downstream along the assembly line 10 for further vehicle assembly as indicated at 44. Further vehicle assembly could include, for example, installation of the engine within body-in-white the vehicle body 14, installation of the interior components (e.g., dashboard, seats, etc.), installation of the various mechanical and electrical components that operate the vehicle, etc.

With reference now to FIG. 2, an adaptive vehicle manufacturing method or process will now be described for reducing vibrations and/or improving interior sound performance. In accordance with an exemplary embodiment, the method or process of FIG. 2 can be performed on the assembly line 10 of FIG. 1 and will be so described; however, it is to be appreciated that the method/process of FIG. 2 need not be limited to the assembly line of FIG. 1 and could be performed independent therefrom. In the illustrated method, vibration sensitivity of at least one body-in-white vehicle component is optionally measured in 60. As discussed in reference to FIG. 1, the components and/or sub-components having their vibration sensitivity optionally measured at 60 can be those provided by a supplier or fabricated (i.e., manufactured) in-house. In one exemplary embodiment, only components and/or sub-components of the body-in-white vehicle body 14 that are deemed critical to the overall acoustic sensitivity and interior sound performance of the vehicle being manufactured have their vibration sensitivity optionally measured at 60. For example, as shown in FIG. 1, the components/sub-components can include tailgate 30 and front door 32, both considered as having a significant impact on vibrations in the body-in-white vehicle body 14. As is known and understood by those skilled in the art, the particular components and/or sub-components optionally measured for vibration sensitivity at 60 (or 28 in FIG. 1) can be measured using laser devices which characterize the vibration sensitivity of the vehicle parts when a vibratory load is applied to the part being tested or measured.

Next, the body-in-white vehicle body 14 is assembled at 62. Specifically, assembly of the body-in-white vehicle body 14 includes securing the body-in-white vehicle components and/or sub-components which had their vibration sensitivity optionally measured at 60. For example, assembling the body-in-white includes welding at least a first body-in-white vehicle component (e.g., tailgate 30) to at least a second body-in-white vehicle component (e.g., door 32), wherein both the first and second body-in-white vehicle components are those having their vibration sensitivity measured in 60 (e.g., tailgate 30 and door 32). Thus, the body-in-white vehicle body 14 is formed from a plurality of components and/or sub-components which can be welded together at weld station 12 in assembly line 10 and one or more of these components and sub-components are those which have had their vibration sensitivity measured (optionally) at 60. Although not shown, the method of FIG. 2 can optionally include a step of receiving one or more of the body-in-white vehicle components and/or sub-components from a supplier and vibrations can be measured from the one or more vehicle components received from a supplier.

After the body-in-white vehicle body 14 is assembled such as via welding at weld station 12, the vibration sensitivity of the body-in-white vehicle body 14 is optionally measured at 64 (or at 34 in FIG. 1). While both 60 and 64 are indicated as the optional, it is to be understood that the method of FIG. 2 includes measuring vibrations in at least one of the one or more body-in-white vehicle components and/or the body-in-white vehicle body 14. In other words, if not both, either one or more components and/or sub-components have their vibration sensitivity measured at 60 or the assembled body-in-white vehicle body 14 has its vibration sensitivity measured at 64.

Next, at 66 (or at 36 in FIG. 1), an optimal damping package is determined for the body-in-white vehicle body 14 based on at least one of the measured vibration sensitivity of the at least one body-in-white vehicle component and/or sub-component (taken at 60) and/or the measured vibration sensitivity taken at the assembled body-in-white vehicle body 14 (taken at 64). In an exemplary embodiment, the optimal damping package determined for the body-in-white vehicle body 14 at 66 is based on both the measured vibration sensitivity of one or more of the body-in-white vehicle components taken at 60 (e.g., tailgate 30 and vehicle door 32) and the measured vibration sensitivity of the assembled body-in-white vehicle body 14 taken at 64. By determining an optimal damping package for each body-in-white vehicle body 14 measured on assembly line 10, the illustrated method provides a process where each body-in-white vehicle body 14 can be tuned to minimize variation and response level. For determining the optimal damping package, CAE models and optimization routines can be run on an associated computer or processor (not shown) while the body-in-white vehicle body 14 continues to be passed down the assembly line 10. In particular the optimal damping package is a package indicating where to apply damping or/or mass to the body-in-white vehicle body 14 to reduce vibrations and thereby improve interior sound performance for the vehicle that ultimately includes the body-in-white vehicle body 14. Thus, the vibration sensitivity measurements taken at 60 and/or 64 are used in an optimization routine that determines the best location for mass and damping elements to reduce acoustic response of the body-in-white vehicle body 14.

Turning to FIG. 3, further process blocks are illustrated that can be performed as part of the adaptive vehicle manufacturing method depicted in FIG. 2. As shown at 70, a damping package can be applied to the body-in-white vehicle body 14 based on the measured vibrations taken at 60 and/or 64. The damping package is that determined at 66 for the body-in-white vehicle body 14. Applying the damping package includes applying damping and/or mass elements to the body-in-white vehicle body 14 corresponding to the optimal damping package determined at 66. As shown, however, the body-in-white vehicle body 14 can be painted at 72 prior to the application of the damping and/or mass to the body-in-white vehicle body 14 corresponding to the optimal damping package. In one exemplary embodiment, the optimal damping package includes both damping and mass elements and thus the application of the damping package at 70 includes applying both damping and mass elements to the body-in-white vehicle body 14 for reducing vibrations. In one exemplary embodiment, as illustrated in FIG. 1, determining the optimal damping package from the measured vibrations taken at 28 or 34 can be done while the body-in-white vehicle body 14 is at paint station 18 and receiving a paint application. The optimal damping package, which can be a computer program or a set of instructions, can be transferred to damping robots such as robot 22, once determined at 66 (or 36 in FIG. 1). The one or more robots 22 can then spray damping (e.g., spray meltsheet) on the body-in-white vehicle body 14 according to the damping package at the damping station 20 and after the body-in-white vehicle body 14 is painted at the paint station 18.

While it is expected that significant reductions in vibrations and corresponding improvements in the interior sound performance will be gained by the foregoing, in one exemplary embodiment a further round of vibration sensitivity testing is done, a secondary damping package developed and then applied to the vehicle to further reduce vibrations and improve interior sound performance. More particularly, as shown at 74 (or at 38 in FIG. 1), the vibration sensitivity of the body-in-white vehicle body 14 can again be measured after painting at the paint station 18 and application of damping corresponding to the optimal damping package is applied at damping station 20. Advantageously, this second round of vibration sensitivity measurements will have the effect of determining the vibration sensitivity of the body-in-white vehicle body 14 after painting and confirming the effectiveness of the damping package applied at 70. With the vibration sensitivity measurements from 74, a secondary damping package can be determined at 76 (or at 40 in FIG. 1) for the body-in-white vehicle body 14 (i.e., painted and with damping from the optimal damping already applied) based on the measured vibration sensitivity of the body-in-white vehicle body 14 taken at 74.

Like the determination of the first or optimal damping package, determination of the secondary damping package at 76 can be an optimization routine performed on CAE servers which identify an optimal secondary damping package for the vehicle (e.g., further damping and/or mass elements). In one exemplary embodiment, a secondary damping package only employs small mass dampers which are applied to the dash panel and floor (neither shown) of the body-in-white vehicle body 14. Thus, the secondary damping package determined at 76 only determines where such small mass dampers are to be located in one exemplary embodiment and, at 78, the secondary damping package is applied to the body-in-white vehicle body 14, which can be at the secondary damping station 42 on the assembly line 10 of FIG. 1. Accordingly, in an exemplary embodiment, applying a secondary damping package to the body-in-white vehicle body 14 can include application of mass dampers to the body-in-white vehicle body 14 at specific locations thereon corresponding to the secondary damping package determined at 76. After the secondary damping package is applied at 78 (e.g., at the secondary damping station 42 on assembly line 10), the body-in-white vehicle body 14 can be sent further down the assembly line (e.g., assembly line 10) for further vehicle assembly. This can include securing further vehicle components to the body-in-white vehicle body 14 to assemble a vehicle, such as installing the engine, transmission, vehicle interior, etc.

Advantageously, use of a customized damping package including a damping package determined at 66 and optionally a secondary damping package determined at 76, vibrations can be reduced in the assembled vehicle resulting in improved interior sound performance. Additionally, cost and weight savings are achieved because less damping and/or mass elements are typically employed on many of the body-in-white vehicle bodies 14 assembled. This has an upstream impact in that the vehicles can be designed to be lighter, giving up some designed acoustic performance usually embedded in the vehicle design because the vehicle design can account for the on-line body tuning process to significantly reduce the response level of the vehicle body. Also advantageously, vehicle variation with respect to vibrations and interior sound performance can be reduced thereby improving quality due to the custom tailoring of the optimal damping package and/or the secondary damping package for each body-in-white vehicle body 14 manufactured on the assembly line 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An adaptive vehicle manufacturing method for reducing vibrations and improving interior sound performance, comprising:
   assembling a body-in-white vehicle body including securing at least one body-in-white vehicle component;
   measuring vibration sensitivity of at least one of: said at least one body-in-white vehicle component or said body-in-white vehicle body; and
   determining an optimal damping package for said body-in-white vehicle body based on at least one of said measured vibration sensitivity of said at least one body-in-white vehicle component and said measured vibration sensitivity of said body-in-white vehicle body.

2. The adaptive vehicle manufacturing method of claim 1 wherein determining said optimal damping package for said body-in-white vehicle body is based on both said measured vibration sensitivity of said at least one body-in-white vehicle component and said measured vibration sensitivity of said body-in-white vehicle body.

3. The adaptive vehicle manufacturing method of claim 1 wherein assembling said body-in-white vehicle body includes welding a first body-in-white vehicle component to a second body-in-white vehicle component, said at least one body-in-white vehicle component including one or both of said first and second body-in-white vehicle components.

4. The adaptive vehicle manufacturing method of claim 1 further including:
   applying damping and/or mass to said body-in-white vehicle body corresponding to said optimal damping package.

5. The adaptive vehicle manufacturing method of claim 4 further including:
   prior to applying said damping and/or said mass to said body-in-white vehicle body, painting said body-in-white vehicle body.

6. The adaptive vehicle manufacturing method of claim 4 wherein applying said damping and/or said mass to said body-in-white vehicle body corresponding to said optimal damping package includes:
   transferring said optimal damping package to damping robots; and
   spraying damping on said body-in-white vehicle body with said spray damping robots, said spraying of said meltsheet corresponding to said optimal damping package.

7. The adaptive vehicle manufacturing method of claim 1 further including:
   measuring vibration sensitivity of said body-in-white vehicle body with said damping applied thereto; and
   determining a secondary damping package for said body-in-white vehicle body with said damping applied based on said measured vibration sensitivity of said body-in-white vehicle body with said damping applied.

8. The adaptive vehicle manufacturing method of claim 7 further including:
   applying the secondary damping package to said body-in-white vehicle body.

9. The adaptive vehicle manufacturing method of claim 8 wherein applying said secondary damping includes applying mass dampers to said body-in-white vehicle body at specific locations thereon corresponding to said second damping package.

10. The adaptive vehicle manufacturing method of claim 8 further including:
    securing further vehicle components to said body-in-white vehicle body to assemble a vehicle.

11. The adaptive vehicle manufacturing method of claim 1 wherein said at least one body-in-white vehicle component is at least one of a tailgate frame, a passenger cabin entry door, a floor panel, a dash component, a firewall component, a roof component, a wheel housing, a spare tire well housing, a seat well housing or a parcel shelf.

12. A vehicle manufacturing process, comprising:
   assembling a body-in-white vehicle body including at least one body-in-white vehicle component;
   measuring vibrations in at least one of: one or more of said at least one body-in-white vehicle component and said body-in-white vehicle body;
   determining a damping package from said measured vibrations; and
   applying said damping package to said body-in-white vehicle body.

13. The vehicle manufacturing process of claim 12 further including:
   receiving said at least one body-in-white vehicle component from a supplier, and wherein said measuring of said vibrations includes measuring vibrations in said at least one body-in-white vehicle component from said supplier.

14. The vehicle manufacturing process of claim 12 wherein said applying of said damping package includes applying damping and mass to said body-in-white vehicle body for reducing vibrations.

15. The vehicle manufacturing process of claim 14 wherein applying damping includes:
   transferring said damping package to a controller that operates spray robots; and
   spraying damping on said body-in-white vehicle according to said damping package with said spray robots.

16. The vehicle manufacturing process of claim 12 further including:
   painting said body-in-white vehicle body prior to applying said damping package.

17. The vehicle manufacturing process of claim 16 further including:
   a) measuring vibrations of said body-in-white vehicle body after painting thereof and application of said damping package;
   b) applying a secondary damping package based on said measured vibrations in a).

18. A vehicle assembly line, comprising:
   a weld station for welding a body-in-white vehicle body from body-in-white vehicle components;
   a paint station for painting said body-in-white vehicle body; and
   a damping station for applying damping to said body-in-white vehicle body after painting thereof, said damping station including robots for applying a damping package to said body-in-white vehicle body based on vibration sensitivity measurements of at least one of: said body-in-white vehicle body and one or more of said body-in-white vehicle components.

19. The vehicle assembly line of claim 18 wherein said vibration sensitivity measurements are taken of said body-in-white vehicle body and at least one of said body-in-white vehicle components and said damping package is determined based on said vibration sensitivity measurements, wherein said vibration sensitivity measurements are taken and said damping package is determined simultaneously with manufacture of said body-in-white vehicle on said vehicle assembly line.

20. The vehicle assembly line of claim 18 further including:
   a second damping station for applying secondary damping to said body-in-white vehicle body after application of said damping based on vibration sensitivity measurements of said body-in-white vehicle body taken after said damping is applied at said damping station.

21. The vehicle manufacturing process of claim 15 wherein said transferring further includes:
   associating said damping package to a particular vehicle type; and
   storing said damping package in the controller to be recalled by said robot when said particular vehicle type is being worked on by said robot.

* * * * *